(12) United States Patent
Reymann et al.

(10) Patent No.: US 10,246,015 B2
(45) Date of Patent: Apr. 2, 2019

(54) REMOTE OPERATION OF NON-DRIVING FUNCTIONALITY AUTONOMOUS VEHICLES

(71) Applicant: Cubic Corporation, San Diego, CA (US)

(72) Inventors: Steffen Reymann, Guildford (GB); Gavin Smith, Crawley (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/113,245

(22) Filed: Aug. 27, 2018

(65) Prior Publication Data

US 2019/0061619 A1    Feb. 28, 2019

Related U.S. Application Data

(60) Provisional application No. 62/550,375, filed on Aug. 25, 2017.

(51) Int. Cl.
  *G05D 1/00*    (2006.01)
  *G05D 3/00*    (2006.01)
  (Continued)

(52) U.S. Cl.
  CPC ............. *B60Q 9/00* (2013.01); *G05D 1/0011* (2013.01); *G05D 1/0088* (2013.01);
  (Continued)

(58) Field of Classification Search
  CPC ...... B60Q 9/00; G05D 1/0011; G05D 1/0088; G05D 1/0212; G05D 2201/0212; B60R 21/12
  See application file for complete search history.

(56) References Cited

U.S. PATENT DOCUMENTS

2016/0303969 A1* 10/2016 Akula .................. A61B 5/6893
2017/0308082 A1* 10/2017 Ullrich ................. G05D 1/0038
(Continued)

FOREIGN PATENT DOCUMENTS

CN      107038610 A    8/2017
JP      2015-176444 A  10/2015

OTHER PUBLICATIONS

International Search Report and Written Opinion dated Jan. 31, 2019 in application No. PCT/US2018/048079, all pages.
(Continued)

*Primary Examiner* — Harry Y Oh
(74) *Attorney, Agent, or Firm* — Kilpatrick Townsend & Stockton LLP

(57) ABSTRACT

An autonomous transit vehicle includes a vehicle body, a drive mechanism for propelling the body, an audio/video communications device that is in communication with a remote control system, an imaging sensor, a processing unit in communication with the drive mechanism, the communications device, and the sensor. The vehicle includes a memory having instructions stored thereon that cause the processing unit to detect improper behavior by a passenger on the transit vehicle, communicate a notification to the passenger that the improper behavior was detected, detect that the passenger has not rectified the improper behavior, record an image of the passenger, and communicate an alert to a security device. The alert may include the image of the passenger and an indication of the improper behavior. The instructions further cause the processing unit to notify the passenger that the image has been recorded and sent to the security device.

19 Claims, 7 Drawing Sheets

(51) Int. Cl.
*G06F 7/00* (2006.01)
*G06F 17/00* (2006.01)
*B60Q 9/00* (2006.01)
*G05D 1/02* (2006.01)
*B60R 21/12* (2006.01)

(52) U.S. Cl.
CPC ............ *G05D 1/0212* (2013.01); *B60R 21/12* (2013.01); *G05D 2201/0212* (2013.01)

(56) References Cited

U.S. PATENT DOCUMENTS

| | | | | |
|---|---|---|---|---|
| 2017/0330044 | A1* | 11/2017 | Telpaz | G05D 1/0088 |
| 2018/0150695 | A1* | 5/2018 | Guttmann | G06K 9/00718 |
| 2018/0150698 | A1* | 5/2018 | Guttmann | G06K 9/00718 |
| 2018/0284793 | A1* | 10/2018 | Wood | B60K 28/12 |

OTHER PUBLICATIONS

Invitation to Pay Additional Fees and, Where Applicable, Protest Fee dated Dec. 7, 2018 in Patent Application No. PCT/US2018/048079, all pages.

* cited by examiner

REMOTE OPERATION OF NON-DRIVING FUNCTIONALITY AUTONOMOUS VEHICLES

CROSS-REFERENCES TO RELATED APPLICATIONS

This Application claims priority to U.S. Provisional Patent Application No. 62/550,375, filed Aug. 25, 2017, entitled "PASSENGER AND REVENUE PROTECTION ON AUTONOMOUS BUSES," the entire disclosure of which is hereby incorporated by reference, for all purposes, as if fully set forth herein.

BACKGROUND OF THE INVENTION

Autonomous vehicle solutions are being developed for controlling the operation of driving functions of vehicles in transit applications. However, merely automating the driving operations does not result in feasible autonomous systems, as there are numerous non-driving functions that are performed by humans in transit applications. For example, on buses (and similarly on other transit vehicles), a driver regularly performs various non-driving functions, such as validating tickets, monitoring passenger behavior, performing functions related to revenue protection, etc. Thus, merely automating the driving functionality does not solve all the problems associated with operating autonomous transit systems.

BRIEF SUMMARY OF THE INVENTION

Embodiments of the present invention provide remote "driver" solutions for autonomous transit vehicles that allow a single vehicle operator/driver to remotely control the various non-driving functions for multiple transit vehicles. The operators may be stationed remotely from the transit vehicles and be provided with video communications links to each vehicle and in some embodiments other sensor data, such as vehicle fault detection sensors, fare validation sensors, and the like on each respective vehicle. The remote operator may then use the video communications links to interact with passengers as though the operator were on board the vehicle and may control various functions of the vehicle such as doors, routes, temperature control system, and/or the like.

In one embodiment, an autonomous transit vehicle is provided. The vehicle may include a vehicle body, a drive mechanism configured to propel the vehicle body, an audio/video communications device that is in communication with a remote control system, an imaging sensor, a processing unit in communication with the drive mechanism, the audio/video communications device, and the imaging sensor, and a memory having instructions stored thereon. When executed, the instructions may cause the processing unit to detect, using the imaging sensor, improper behavior by a passenger on the transit vehicle, communicate, using the audio/visual communications device, a notification to the passenger that the improper behavior was detected, and detect, using the imaging sensor, that the passenger has not rectified the improper behavior. The instructions may also cause the processing unit to record, using the imaging sensor, an image of the passenger, communicate an alert to a security device, the alert comprising the image of the passenger and an indication of the improper behavior, and notify the passenger that the image has been recorded and sent to the security device.

In another embodiment, a method for remotely controlling non-driving functions of an autonomous transit vehicle is provided. The method may include detecting, using an imaging sensor of the autonomous vehicle, improper behavior by a passenger on the transit vehicle and communicating, using an audio/visual communications device of the autonomous vehicle, a notification to the passenger that the improper behavior was detected. The method may also include detecting, using an imaging sensor of the autonomous vehicle, that the passenger has not rectified the improper behavior and recording, using the imaging sensor, an image of the passenger. The method may further include communicating an alert to a security device, the alert comprising the image of the passenger and an indication of the improper behavior and notifying the passenger that the image has been recorded and sent to the security device.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
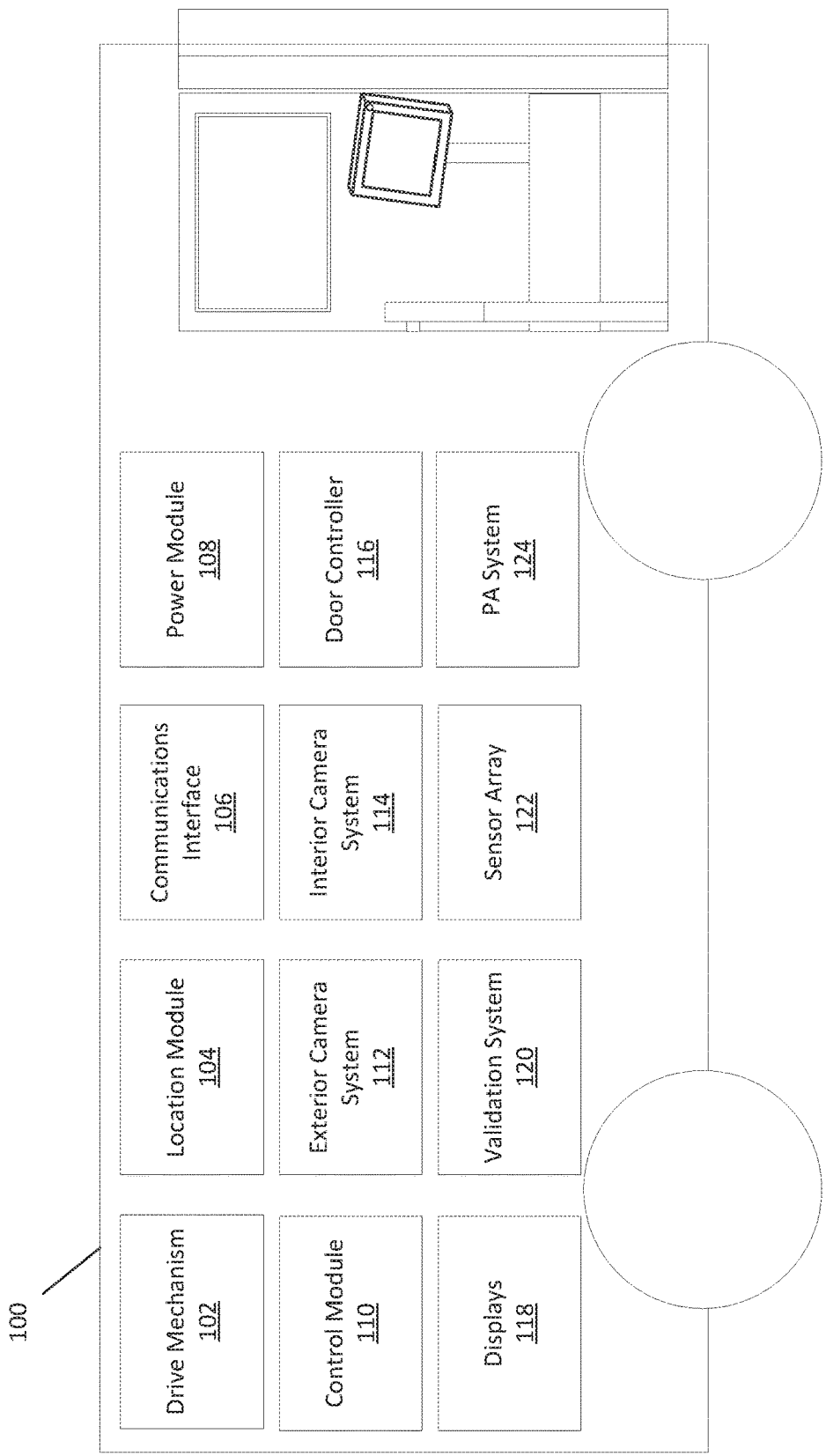
FIG. 1 depicts a system diagram of an autonomous vehicle according to embodiments.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention(s) described herein are generally related to passenger protection and revenue protection systems and methods on autonomous buses. That said, a person of ordinary skill in the art will understand that alternative embodiments may vary from the embodiments discussed herein, and alternative applications may exist (e.g., on taxis, trains, etc.).

The techniques provided herein below are directed to electronically replacing the non-driving functions performed by an on-vehicle driver with a remote operator so as to enable the removal of vehicle drivers from vehicles that can autonomously drive. As discussed above, merely automating the driving functions does not enable the operation of a safe and effective autonomous transit system. Rather, full automation is only achievable when critical non-driving functions (such as validating tickets, monitoring passenger behavior, and/or performing functions related to revenue protection, safety, and/or comfort etc.) are also automated. Embodiments of the present invention solve these problems and support removal of human vehicle operators from public transit vehicles while still providing all of the authoritative, safety, and revenue protection benefits of having a member of operational staff on-board. In such a manner, a single remote operator may be able to perform all of the non-driving functions for a large number of vehicles using a single interface. According to some embodiments, a certain system architecture is put into place that enables such automation, including components on an autonomous vehicle, in a driver call center, and elsewhere (e.g., in the "cloud", back office, etc.).

Embodiments that automate non-driving functions of a number of transit vehicles in the manner described herein may include any of a variety of features. One such feature, for example, is a live video link to remote drivers while the bus is at a stop, automatically giving remote driver access to relevant bus controls and status information. Additionally or alternatively, embodiments may use remote bus systems to control and override functions from remote driver's call center. Embodiments may employ automated tracking of passengers that do not have a valid ticket, with automatic and dynamic severity label allocation to passenger as to fare evasion risk. Additionally or alternatively, embodiments may employ automated revenue protection escalation. Finally, embodiments may use automated on-bus behavior monitoring and remote alert generation, depending on seriousness of behavior level.

Turning now to FIG. 1, a system diagram of one embodiment of an autonomous vehicle 100 is shown. The autonomous vehicles 100 described herein may be used as full-time and/or part time public and semi-public transit options. For example, the autonomous vehicles 100 may be busses, taxis, trains, rideshare vehicles, aircraft, watercraft and/or other public and/or hired vehicles. These vehicles may be routed to pick up any number of passengers, either to predetermined locations (such as set transit stops) and/or locations that are selected by the passengers during and/or prior to the ride. Each of the autonomous vehicles 100 may define a passenger cabin that is designed for seating or otherwise transporting one or more passengers.

Each autonomous vehicle 100 may include a drive mechanism 102, such as a motor, engine, transmission, or other mechanism for putting the autonomous vehicle 100 into motion. It will be appreciated that drive mechanism 102 may be fueled by gasoline, diesel, electricity, hydrogen, natural gas, biofuel, and/or any other suitable energy source. Drive mechanism 102 may also include one or more steering mechanisms, such as a steering wheel, to adjust a heading of the autonomous vehicle 100. Autonomous vehicle 100 may also include a location module 104. Location module 104 may include a location determining device, such as a global positioning satellite (GPS) system that can determine a present location of the autonomous vehicle 100. In some embodiments, the location module 104 may also be able to determine a path or likely path of the autonomous vehicle 100. The path or likely path may be determined by a user and/or remote operator entering a destination location into the GPS system, with the location module 104 calculating and providing a travel route to the user and/or the drive mechanism 102 of autonomous vehicle 100. For example, if the autonomous vehicle 100 is in an automated state, the location module 104 may determine a destination location and a path on which to travel to arrive at the destination. The path may be a set transit route, may be based on a quickest path, which may involve retrieving current and/or historical traffic data to determine a likely quickest path, a path having a shortest distance, a path that avoids highways, toll roads, or specific locations, and/or some combination of the above factors and/or additional criteria. The path may be used to generate a set of directions that may be provided to the drive mechanism to determine a speed and/or direction of travel of the autonomous vehicle 100. In some embodiments, the destination and/or routing information may be provided to the autonomous vehicle 100 by a fleet management system.

Autonomous vehicle 100 may also include a communications module 106. Communications module 106 may be configured to communicate with external devices, such as a remote control system and/or external security device, using one or more wireless communications protocols. For example, cellular signals such as 3G, 4G, LTE, and/or other cellular data networks may be used in conjunction with communications module 106. Other wireless protocols such as Wi-Fi, Bluetooth, WiMAX, and/or other wireless communications protocols may also be used. Communications module 106 may be used to interface the autonomous vehicle 100 with one or more external devices, such as other autonomous vehicles, a fleet management system, manually driven vehicles, mobile devices such as laptops, mobile phones, tablet computers, and the like, and/or other electronic devices. This allows autonomous vehicle 100 to send data related to its speed, heading, and/or expected route to other vehicles and systems, as well as receive data, such as traffic information, destination data, routing data, rider information, data from other autonomous vehicles, and/or other data. Such information may be used by the autonomous vehicle 100 (sometimes at command of a fleet management system) to alter routes, change vehicle/passenger matches, determine original matches, etc. In some embodiments, the autonomous vehicle 100 may receive one or more commands, such as commands that activate an ignition mechanism of the autonomous vehicle and/or cause the autonomous vehicle 100 to adjust a speed, heading, and/or route.

Autonomous vehicle 100 may also include a power module 108 that includes one or more batteries. Power module 108 may be configured to supply power to the various electronic systems, such as the location module 104, communications module 106, and a control module 110. In some embodiments, such as those where autonomous vehicle 100 is an electric and/or hybrid vehicle, power module 108 may be used to power the drive mechanism 102 of autonomous vehicle 100. In some embodiments, the power module 108 may be configured to supply power to a portion of the autonomous vehicle 100 at all times, even when the vehicle is parked, without an occupant, and/or in an inactivated state. For example, the power module 108 may supply a small amount of power to the communications module 108 and/or the control module 110 that allows the autonomous vehicle 100 to receive a wakeup command from a fleet management system and/or other remote start mechanism.

Such a wakeup command may be received using the communications module 106 and may instruct the control module 110 to activate the autonomous vehicle 100, such as by activating an ignition mechanism of the autonomous vehicle 100. This allows a traffic control center to control an autonomous vehicle 100 even when the autonomous vehicle 100 has been parked and turned off.

The autonomous vehicle 100 may also include one or more doors that may be actuated using a door controller 116, which may control the opening, closing, locking, and/or unlocking of the vehicle's doors. The door controller 116 may be remotely operated by a remote control system, such as those described in greater detail below. The autonomous vehicle 100 may also include a number of displays 118, such as one or more main display screens and/or secondary display screens. These displays may be configured to facilitate audio/video communications between a remote driver and one or more passengers of the autonomous vehicle 100, often by leveraging the capabilities of the communications module 106. As such, some or all of the displays 118 may include a speaker, screen, microphone, and/or video camera to enable bi-directional video conferencing between the parties. Autonomous vehicle 100 may also include a validation system 120, which may include one or more validation devices, such as a wireless card reader and/or biometric authentication mechanism. The autonomous vehicle 100 may also include a sensor array 122, which may include any number of sensors for monitoring various parameters of the autonomous vehicle 100 and/or its equipment. For example, the sensor array 122 may include temperature sensors, noise level sensors, smoke detectors, carbon monoxide sensors, light level sensors, sensors that monitor the various electrical and mechanical systems of the autonomous vehicle 100, and/or other sensors. The autonomous vehicle 100 may also include a public announcement (PA) system 124 that may be used to make general announcements, such as upcoming stops, arrival times, transfer instructions, and the like to passengers.

Control module 110 may include one or more processing units that are specially programmed to execute very specific software commands that are used to control the communication interface, drive mechanism, the location module, the door controller 116, displays 118, validation system 120, sensor array 122, PA system 124, and/or other electronic systems of the autonomous vehicle 100. It will be appreciated that the control module 110 may include multiple modules for different control aspects (drive, video, doors, etc.). Control module 110 may be configured to perform a number of functions associated with controlling the autonomous vehicle 100. For example, upon receipt of a command to turn on autonomous vehicle 100, control module 110 may cause an ignition mechanism, such as a starter of the autonomous vehicle 100, to activate, turning the autonomous vehicle 100 on. This allows a fleet management system to utilize vehicles that are not already on the roadway to pick up passengers. In some embodiments, commands may be received from the fleet management system that cause the drive mechanism 102 and/or other systems of the autonomous vehicle 100 to brake or otherwise decelerate to a lower speed, accelerate, change direction, and/or adjust a route of the autonomous vehicle 100.

In some embodiments, the autonomous vehicle 100 may be selected to receive the route and/or destination based on the autonomous vehicle 100 being parked, out of service, and/or unoccupied. In embodiments where the autonomous vehicle 100 is parked and/or unoccupied, the transmission of the route (and/or a separate transmission) may include an activation command that causes the autonomous vehicle 100 to move onto a roadway and/or into traffic. In some embodiments, the autonomous vehicle 100 may be powered off (except for the communications interface 106 and/or the control module 110) and the activation command may cause the autonomous vehicle 100 to activate an ignition mechanism of the autonomous vehicle 100 to turn on an engine, motor, and/or other component of the drive mechanism 102.

Various functions of the autonomous vehicle 100 may be remotely operated by a human. For example, in some embodiments, an initial route and/or subsequent route alteration may be provided by a remote driver via a remote control system. The route information may be provided by the remote control device to the control module 110, such as by using the communications module 106. The remote control system may be configured to control aspects of the vehicle 100, including a climate control system, volume of various components, door controller 116, displays 118, other imaging sensors such as sensors 112, 114 (such as providing the remote driver the ability to pan and/or zoom with a particular camera or other imaging device), and/or other components of the autonomous vehicle 100.

In some embodiments, updated route information may be provided to the autonomous vehicle 100. For example, the updated route information may include data related to cancelling or modifying the request, traffic information, weather information, or other data, which may trigger a rerouting of the autonomous vehicle 100. While described with many of the speed, route, and/or direction commands being controlled by control module 110 of autonomous vehicle 100, it will be appreciated that a central control system, such as the remote control system, may be able to remotely control these functions of any number of autonomous vehicles 100 for various reasons.

In some embodiments, the autonomous vehicle 100 may include one or more image capture systems. For example, an exterior camera system 112, such as a closed circuit television (CCTV) system may be mounted to and/or within an exterior of the body of the autonomous vehicle 100 such that an area outside of the autonomous vehicle 100 may be monitored. This allows images to be captured of people and objects near an exterior of the autonomous vehicle 100. Such imaging may be used to detect whether there are people near the vehicle 100, a number of people, the mood (aggressiveness/calmness, etc.) of the people, etc. For example, the images may be sent to the remote control system such that the images may be monitored by a remote driver, which may analyze the images. In some embodiments, autonomous vehicle 100 may include an interior camera system 114. Interior camera system 114 may be mounted within the passenger cabin of the autonomous vehicle 100 and may be designed to monitor any passengers within the autonomous vehicle 100.

Figure 2:
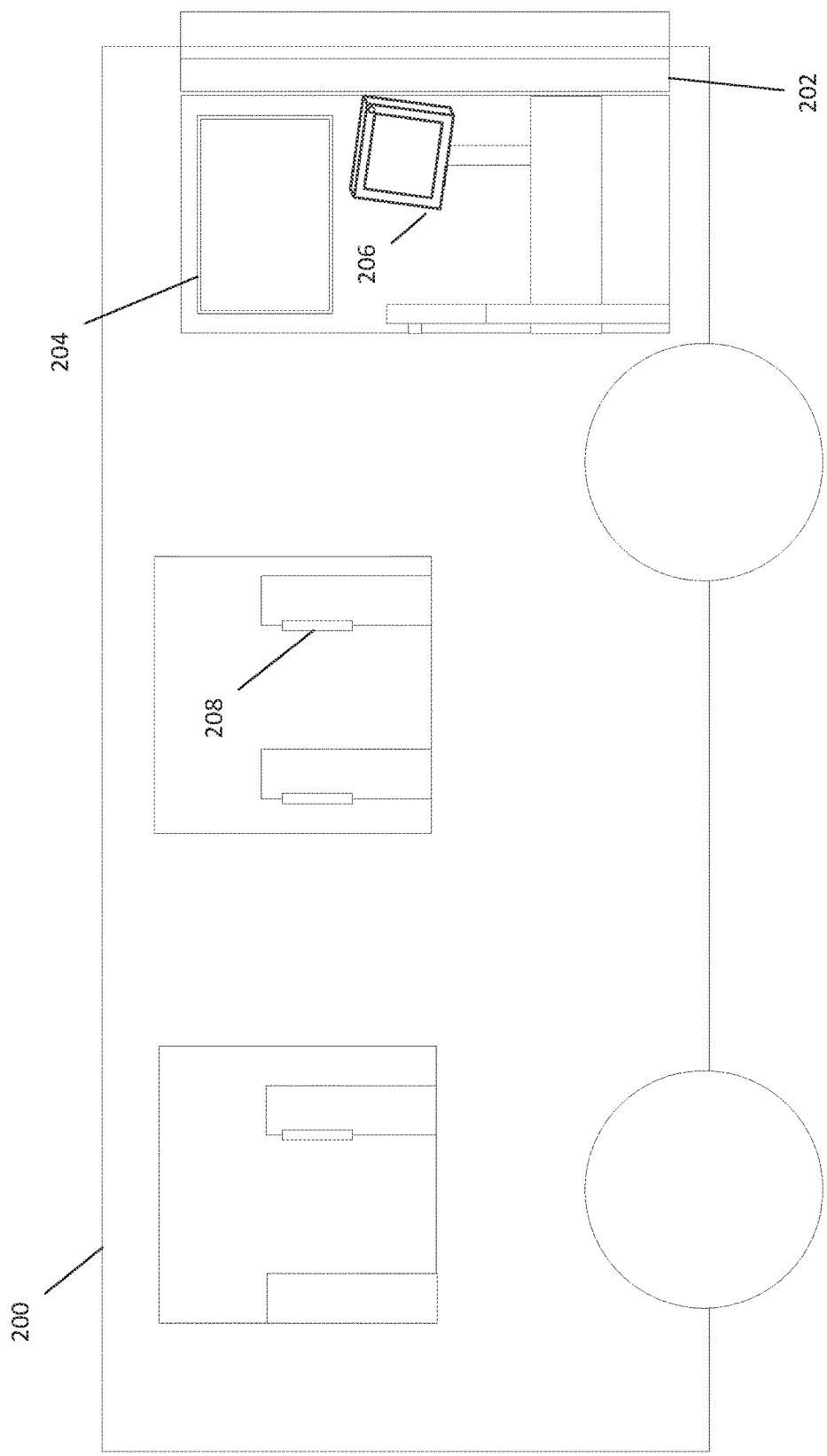
FIG. 2 depicts an autonomous vehicle according to embodiments.

FIG. 2 depicts an autonomous vehicle 200, which may be the same or different than autonomous vehicle 100. While shown as a bus, it will be appreciated that autonomous vehicle 200 may be any sort of vehicle, including a bus, train, monorail, car, truck, aircraft, watercraft, and/or any other autonomous vehicle. Autonomous vehicle 200 may include one or more doors 202 that may be opened and closed and possibly locked and unlocked. Doors 202 may be remotely actuated by a remote driver operating a remote control system. A main display screen 204 may be positioned near each entrance and/or set of doors 202 of the vehicle 200. While shown as being directed at the entrance, it will be appreciated that the main display screen 204 may be positioned at any location and in any orientation near the entrance such that passengers may see the main display screen 204 and can interact with a remote driver of the autonomous vehicle 200. This allows the remote driver to greet passengers as they board and offer any assistance that a passenger may need. For example, the remote driver may control the opening and/or closing the doors while monitoring videos of the passengers to ensure that the doors remain open while passengers are attempting to board. The remote driver may also control any wheelchair lifts/ramps, under deck storage, and/or other electrical and/or mechanical systems of the autonomous vehicle 200. Such video may be provided by cameras of the main display screen 204, secondary display screens 208, and/or stand-alone cameras or other imaging sensors. The main display screen 204 may be an audio/video communications device that includes at least one display, at least one speaker, at least one microphone, and at least one imaging device, such as a camera. This allows the main display screen 204 to be used for video calls in which a remote driver can be seen and talk to one or more passengers as they board the vehicle 200. The main display screen 204 (specifically the imaging device) may be used by the remote driver to monitor the behavior of the passengers. For example, the remote driver may monitor the validation results of fare media of each passenger and communicate with those passengers who do not successfully validate. The main display screen 204 may also be used to provide general messages to passengers of the vehicle 200, such as announcements regarding delays, upcoming transit stops, arrival times, and/or other information.

The autonomous vehicle 200 may also include at least one card reader 206 and/or other validation device (such as a biometric validation device) at each entrance of the vehicle 200. The card reader 206 may be configured to wirelessly receive data from fare media, such as by using NFC, other RFID signals, magnetic stripe reader, barcode reader, and/or other reader for wirelessly reading and/or writing data to a fare media. The data read from the fare media may be locally validated by the card reader 206 and/or connected validation processor and/or by communicating all or part of the data to a ticketing back office for remote, centralized validation of the fare media. In some embodiments, the card reader may include a feedback system, such as a light, display, and/or speaker that provides feedback as to validation results for each passenger.

The autonomous vehicle may also include a number of secondary display screens 208. These secondary display screens 208 may be spaced apart along the passenger cabin of the vehicle 200. As just one example, there may be a secondary display screen 208 provided for each seat and/or set of seats within the passenger cabin. In other embodiments, only a handful of seating areas may include a secondary display screen 208. The secondary display screens may be mounted in any number of manners throughout the passenger cabin. For example, the secondary display screens 208 may be mounted on or in the back of seats, on or in walls and/or other partitions, on or in a roof of the vehicle 200, and/or in any other manner. The secondary display screens 208 may be smaller versions of the main display screen 204 and may be configured to facilitate video calls between passengers and a remote driver. Such displays enable discrete conversations and other interactions between passengers and remote drivers, such as to discuss improper behavior by a passenger and/or to allow the remote driver to check in and assist passengers on an individualized basis. In some embodiments, the main display screen 204 and/or secondary display screens 208 may include a button or icon (if touchscreens) that allows a passenger to request a video call with the remote driver. Upon pressing the button or icon, the relevant display may establish (or the remote driver may establish) a video call between the display and a remote control device.

Figure 3:
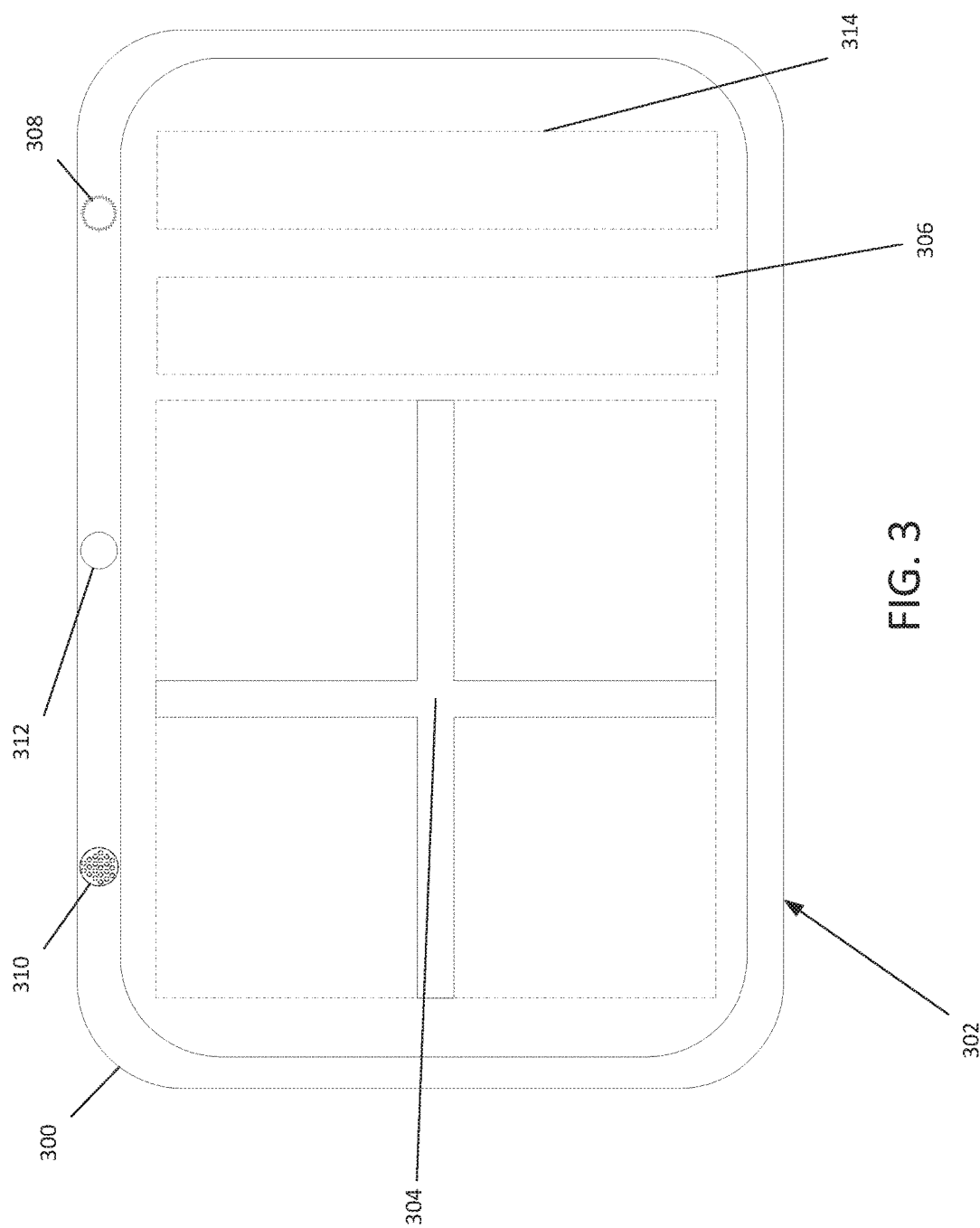
FIG. 3 depicts a remote control system for autonomous vehicles according to embodiments.

FIG. 3 depicts a schematic diagram of one embodiment of a remote control device 300 for remotely controlling non-driving functions of one or more autonomous vehicles, such as autonomous vehicles 100 and/or 200. The remote control device 300 may include a display screen 302 and may include one or more input devices, such as a touchscreen, stylus, keyboard, mouse, and/or other input device. The display screen 302 may display a graphical user interface that allows a remote driver or operator to monitor data related to a number of autonomous vehicles, as well as monitor and interact with the passengers. For example, the interface may include a primary video display area 304, which may be used to display video feeds from one or more autonomous vehicles. In some embodiments, the remote driver may select a particular one of the feeds to enlarge the image and/or to initiate a video call with a main display screen of the selected autonomous vehicle. When not singling out a particular vehicle, the remote driver is able to monitor the passengers on a number of vehicles simultaneously. In some embodiments, a particular video feed may be enlarged and/or otherwise highlighted or singled out automatically, such as when a particular vehicle needs the remote driver's input. For example, a call request may be initiated by a passenger on board the vehicle, which may either automatically establish the video call or cause a prompt to display on the remote control device 300 that informs the remote driver that the passenger would like to start a video call. The remote driver may then initiate the call using the remote control device 300. As another example, if a vehicle arrives at a transit stop, the relevant video feed may be enlarged or highlighted so that the remote driver may monitor the boarding and/or exiting of passengers. In some embodiments, this process may require the remote driver to initiate a command to open and/or close the doors of the vehicle. This may be done by the driver interacting with a control area 306 of the display screen 302. For example, the remote driver may touch or otherwise select an icon or button that controls the actuation of the doors of a particular autonomous vehicle. Such functionality ensures that a human can make judgments on how long and when to open and close doors of the vehicles based on the needs and numbers of passengers. The control area 306 may include icons that control other functions of the autonomous vehicle, such as validation device overrides, wheelchair ramp/lift actuation, video call initiation with a main display screen and/or secondary display screen of the autonomous vehicle, volume controls, brightness controls, PA functionality, vehicle climate control, and/or other functions that may be performed by the remote driver.

The primary video display area 304 may also be used to conduct the video chats with the various autonomous vehicles, allowing the remote driver to interact with passengers for various purposes. To help facilitate these calls, the remote control device 300 may also include a microphone 308, speaker 310, and video camera 312. These components work together to allow passengers to see and hear the remote driver, as well as to be seen and heard by the remote driver. This allows the remote driver to more readily assist passengers, detect and address improper behavior, and/or provide a human presence that enhances the safety and smooth operation of the autonomous vehicle without needing an actual physical human authority presence on each vehicle, but rather simulates this presence by a remote driver who can simultaneously operate non-driving function for a number of autonomous vehicles.

The remote control device 300 may also include a sensor data area 314, which provides a display of sensor readings and warnings from various sensors on each of the autonomous vehicles. This data may be monitored by the remote driver to ensure that the vehicles are safe and operating in a safe and comfortable manner. The remote driver may be able to adjust various component parameters based on this data, such as volume and/or brightness levels, climate control levels, and the like. The data may also inform the remote drivers when a particular vehicle is not safe or otherwise road worthy, such as when smoke, carbon monoxide, and/or mechanical issues are detected. In such situations, the remote driver may use the remote control device 300 to alert authorities of safety problems. Similarly, authorities, such as security personnel, may be alerted by the remote driver using the remote control device 300 when improper behavior by a passenger is detected. For example, a notification may be sent to a security device that includes an image of the user and a description of the detected behavior.

In some embodiments, the remote driver may be able to perform some driving/navigation functions for a particular vehicle. For example, if a safety and/or security issue necessitates a change in route or stopping destination, the remote driver may interact with the remote control device 300 to steer, maneuver, and/or otherwise reroute the vehicle. In some embodiments this may involve the remote driver actually taking over the drive mechanism of the vehicle, such as by remotely controlling the vehicle with a joystick, steering wheel, and/or other directional input device of the remote control device 300, while in other embodiments the remote driver can merely input a new location (such as using coordinates, address, and/or other location data) to be sent to the autonomous vehicle's control module. Such functionality may be particularly useful when security personnel needs to apprehend or confront a particular passenger or when a vehicle needs to be sent in for maintenance.

It will be appreciated that the remote control device 300 described above is merely one example, and other devices, interfaces, screen layouts, etc. may be used in conjunction with the present invention. In particular, any specialized remote control device that facilitates video calls, the exchange of sensor data and hardware commands and/or alerts may be utilized in particular applications. Additionally, while described as a single device, it will be appreciated that the functionality of the remote control device 300 may be provided by one or more separate devices.

Figure 4:
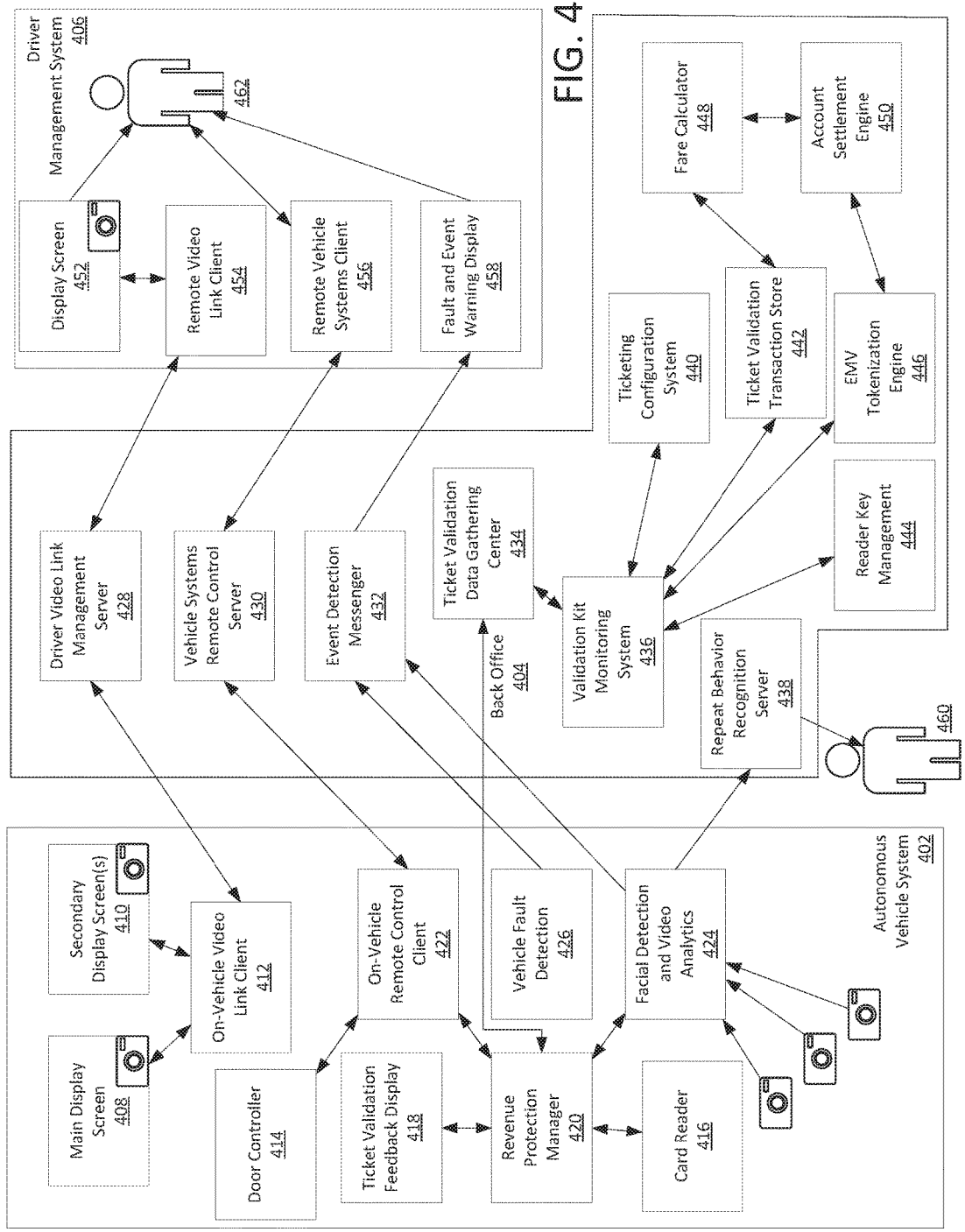
FIG. 4 is a system diagram for a system for remotely controlling autonomous vehicles according to embodiments.

FIG. 4 is a system architecture of an autonomous transit vehicle management system 400 according to one embodiment. The system 400 include three primary subsystems, an autonomous vehicle system 402 (which may be operated by any of the autonomous vehicles 100, 200 described herein), a back office system 404, and a driver management system 406 (such as remote control system 300). The autonomous vehicle system 402 may include a main display screen 408. The main display screen 408 may be configured to enable passengers to see a remote driver (at the driver management system 406). In some embodiments, the main display screen 408 is positioned directly behind the entrance to the vehicle, so passengers may be greeted by a live video of an interactive driver while they board the vehicle. The presence of the interactive driver can provide passengers with confidence that the vehicle and passengers are being monitored by a real person. Similarly, the ability of the remote drive to monitor the passengers and perform actions that may mitigate and/or punish any wrongdoing may deter passengers from behaving poorly in any manner, such as not paying fares, damaging property, and/or disturbing and/or harming other passengers. The main display screen 408 may be a high definition bi-directional audio and video link incorporating speakers, noise cancelling microphones, a video camera and a video display supporting full size face-to-face visibility of the remote driver. This allows the remote drive to not only be seen, but to monitor the actions and behavior of each of the passengers and then to interact with the passengers. These interactions may include greetings, warnings that he detected improper behavior, messages that remedial action is being taken, make announcements to the passengers, and/or otherwise communicate with one or more of the passengers.

While described as being right behind the entrance, it will be appreciated that the main display screen 408 may be positioned at a front or rear of the vehicle and/or at any location in which the main display screen 408 may be viewed by all or the majority of passengers as they board and/or while they are on the vehicle. In embodiments where a vehicle includes multiple entrances, such as many trains and larger buses, there may be multiple main display screens 408, such as one at each entrance of the vehicle.

In some embodiments, the vehicle system 402 may include one or more secondary display screens 410. Each secondary display screen replicates the full bi-directional video and audio capabilities of the main display screen 408. These secondary display screens 410 may be much smaller than the main display screen 408 and may be positioned throughout the vehicle. For example, each seat or set of seats may include its own secondary display screen 410. In some embodiments, the secondary display screens 410 may be positioned on a wall near each seat and/or set of seats, while in other embodiments, the secondary display screens 410 may be mounted on or within a seat back of an adjacent set of seats. In yet other embodiments, the secondary display screens 410 may be mounted on or in a roof of the vehicle so they may be viewed from below. These secondary display screens 410 allow the remote driver to discretely communicate with single individuals and/or small groups of passengers, such as to ask if they are alright and/or to correct undesirable behaviors.

The autonomous vehicle system 402 may also include an on-vehicle video link client 412. The on-vehicle video link client 412 may be a single on-vehicle computerized hub that controls the signal flow to and from the video display systems throughout the vehicle. The on-vehicle video link client 412 incorporates wireless communication networking solutions that enable the video systems to communicate with the remote driver. There may be one or more on-vehicle video link clients 412 on each vehicle. For example, in some embodiments involving larger trains and/or buses, multiple on-vehicle video link clients 412 may be spaced apart along a length of the vehicle.

The autonomous vehicle system 402 may also include a door controller 414. Door controller 414 is an example of a remotely controllable system on the vehicle that can receive commands from a remote driver and supply feedback about its states and events. For example, the door controller 414 may communicate to the remote driver an indication that one or more doors and/or sets of doors of the vehicle is malfunctioning, such as remaining stuck in the open position or closed position. In other embodiments, the door controller 414 may indicate of status of each of the doors and/or sets of doors to the remote driver. For example, the door controller 414 may inform the remote driver that a particular door or set of doors is open, while other doors are closed.

The door controller 414 may also provide the remote driver the ability to control the opening, closing, an/do other functionality of the doors of the vehicle. For example, the remote driver may remotely open the doors when the vehicle comes to a stop at a boarding position. Just prior to departing, the remote driver may remotely close the doors. The remote driver may monitor the position and behavior of passengers on the vehicle and/or near the vehicle and may base his control over the door positioning based on such observations. In some embodiments, the door controller 414 may be used by the remote driver to ensure that a person who has committed a crime, such as fare evasion, may be kept on board the transit vehicle long enough for authorities to arrive at the transit vehicle and apprehend the passenger. For example, the remote driver may utilize the door controller 414 to close and/or lock the door(s) to prevent the passenger in question from leaving. In some embodiments, each door or set of doors may include its own door controller 414, which may include an identifier that allows the remote driver to determine which door or set of doors he is or needs to interact with. In other embodiments, a single door controller 414 may be used to control all of the doors and/or sets of doors on the vehicle.

The autonomous vehicle system 402 may include a card reader 416 that is configured to read data from the ticket media or other access credentials presented by the passenger. The card reader 416 may be configured to read smartcards, mobile phones, passive RFID chips, active RFID chips, magnetic stripe cards, and/or other wireless media. Typically, the card reader 416 is positioned near the entrance and/or exit of the vehicle, and in embodiments with multiple entrances and/or exits, a card reader 416 may be positioned at each one. In some embodiments, in addition to (or instead of) chip reader 416, the autonomous vehicle system 402 may include one or more biometric authentication units that may validate a passenger using fingerprint, facial recognition, and/or other biometric techniques. The autonomous vehicle system 402 may also include a ticket validation feedback display 418, which may be a display that allows the passenger to see the success or failure of the validation of their ticket or other access validation means. In some embodiments, the ticket validation feedback display 418 may be a separate display screen while in other embodiments a portion of the main display screen 408 and/or one or more secondary display screens 410 may be used to display a validation result to the passenger. In embodiments with a separate ticket validation feedback display 418, the ticket validation feedback display 418 may be positioned near the card reader 416 and/or be a part of the card reader 416. The ticket validation feedback display 418 may have a full graphical user interface (GUI) that may provide a validation message and/or may include a light element, such as a light emitting diode (LED) that may light up using a particular color and/or pattern based on a particular validation result. In some embodiments, the ticket validation feedback display 418 may also include one or more speakers that may produce an audible sound or message that indicates the validation result, which may be useful for visually impaired passengers.

The autonomous vehicle system 402 may include a revenue protection manager 420 that may serve as the on-vehicle ticket validation computer that manages the data coming from a revenue protection back office. The revenue protection manager 420 may receive and manage data from the card reader 416 and/or the ticket validation feedback display 418. For example, the revenue protection manager 420 may receive and validate access credential data from the card reader 416 (in some embodiments, the card reader 416 itself may perform the validation) and then based on the validation result, cause a particular result to be displayed by (and possibly sound emitted from) the ticket dilation feedback display 418.

An on-vehicle remote control client 422 may be in communication with the door controller 414, the card reader 416, and/or the ticket validation feedback display 418. The on-vehicle remote control client 422 can receive control commands from a remote driver and relay the commands to the right hardware peripherals of the autonomous vehicle system 402. For example, the remote driver may instruct the on-vehicle remote control client 422 to have the door controller 414 open, close, and/or otherwise control the doors of the vehicle. The on-vehicle remote control client 422 may then relay the relevant command to the door controller 414, which causes the door to provide the desired function. The on-vehicle remote control client 422 may also supply feedback to the driver about the success or failure of the command. The on-vehicle remote control client 422 may also provide validation results and/or other data to the remote driver. For example, if a particular passenger had an unsuccessful validation result, the on-vehicle remote control client 422 may notify the remote driver such that the remote driver may take necessary actions.

The autonomous vehicle system 402 may also include a facial detection and video analytics system 424. The facial detection and video analytics system 424 is an on-vehicle camera fed video analytics system that searches incoming video feeds (from the cameras of the main display screen 408, secondary display screens 410, and/or separate cameras and/or other imaging sensors) for recognizable events or faces. For example, the facial detection and video analytics system 424 can detect crowd build up, abnormally fast moving passengers, passengers who haven't moved for too long, can track passengers who were refused entry to the vehicle and capture their image, and/or detect other behaviors. The facial detection and video analytics system 424 can also check the faces of passengers on-board against a locally held database of persistent fare evaders or people otherwise wanted by the police or security forces. This information may be sent to the remote driver who may determine, what, if any actions are to be taken based on the user's identity and/or behavior. Similarly, the facial detection and video analytics system 424 may be used for facial recognition for biometric authentication purposes, which may allow passengers to validate their access on the vehicle using only their faces rather than (or in addition to) a convention fare media.

The autonomous vehicle system 402 may also include a bus fault detector 426. The bus fault detector 426 is an on-vehicle fault management system that interprets data from a number of sensors throughout the vehicle and passes warnings where needed off to the remote driver call center. This subsystem replicates a real driver's ability to recognize anomalies on the bus they are driving, which might include strange vibrations, sounds, smells, smoke, and/or other issues with or within the vehicle that would normally be detectable by a human driver.

The back office system 404 may include a driver video link management server 428. The driver video link management server 428 is a centralized powerful video call management system that can route and log multiple two way video connections between multiple vehicles and multiple remote drivers. The driver video link management server 428 supports a call center full of drivers being able to each connect to multiple vehicles throughout their shift. For example, the driver video link management server 428 may route audio and/or video communications between the remote driver and the main display screen 408 and/or secondary display screens 410 to enable the remote driver to see, communicate, and/or otherwise interact with passengers. In some embodiments, the driver video link management server 428 may communicate with the on-vehicle video link client 412, which may then control the functionality of the respective display screen(s) 408, 410. In other embodiments, the driver video link management server 428 may communicate directly with the respective display screen(s) 408, 410, thereby bypassing the on-vehicle video link client 412 (possibly rendering the on-vehicle video link client 412 unnecessary).

The back office system 404 may also include a vehicle systems remote control server 430 that routes the messages from the remote driver in the call center to the relevant vehicle and may manage connections from possible hundreds of remote drivers to thousands of autonomous vehicles. For example, the vehicle systems remote control server 430 may be in communication with the on-vehicle remote control client 422 that controls the functionality of (and/or receives data from) the door controller 414, the ticket validation feedback display 418, and/or the card reader 416.

The back office system 404 may include an event detection messenger 432, which is a centralized system that receives all the fault, status change and video analytics event data (acquired using the vehicle fault detector 426 and/or facial detection and video analytics system 424) from all the vehicles in the field and relays them to the remote driver call center so a human can react. The event detection messenger 432 may also escalate warnings not picked up by the call center and log the reactions of the call center to particular events. Such logging may be used for record keeping and/or quality control measures, such as using the data to determine whether a particular remote driver acted in a timely and/or appropriate manner to a particular situation.

The back office system 404 may include a ticket validation data gathering center 434. The ticket validation data gathering center 434 may be a powerful centralized intelligent routing system that routes ticketing system data to and from every vehicle in the system at the ticketing back office, including data about every single ticket validation performed by each card reader 416 and/or revenue protection manager 420. The ticket validation data gathering center 434 may also interact with a validation kit monitoring system 436, a ticketing configuration system 440, a ticket validation transaction store 442, a reader key management system 444, a Europay, MasterCard and Visa (EMV) tokenization engine 446, a fare calculator 448, and/or an account settlement engine 450. The validation kit monitoring system 436 is an operation support system that makes an indication of any fault or unexpected status change from any piece of ticketing kit in the system visible to an operational support team. This allows the operation support team to take corrective action and/or guide field engineers to specific vehicles. For example, if the validation kit monitoring system 436 determines that a particular card reader 416 and/or ticket validation feedback display 418 is malfunctioning, the validation kit monitoring system 436 may provide an indication to the operation support team to send a field engineer to the location of the vehicle to correct the detected issue. In some embodiments, the validation kit monitoring system 436 may directly notify a wireless electronics device of the field engineer (such as using SMS, push notifications, email, and/or other electronic notification means) of the problem. The notification may include a nature of the problem detected, a destination of the vehicle, and/or a location of the vehicle.

The ticketing configuration system 440 manages the complexity of the data sets required to configure each and every ticket validator on the vehicle network, ensuring that each validator knows the correct fares, routes, transit stops, calculation rules, and/or behaviors expected at specific times on each specific vehicle. This data may be proved to each card reader 416 and/or ticket validation feedback display 418 via the revenue protection manager 420 and/or the ticket validation data gathering center 434. The ticket validation transaction store 442 may include one or more databases that store the millions of transactions that are received by the ticket validators (such as card readers 416) throughout a city's transit vehicle network. The data held in the ticket validation transaction store 442 may be used to generate bills for passengers, and as such must be held securely, without loss or duplicate transaction. This data may need to be held for many months, if not years, for analysis, passenger query support, and auditing.

The reader key management system 444 manages the digital security keys required for the encryption and decryption of data by the card readers 416 on the vehicles and in the back office. This functionality includes the generation of the keys, secure deployment of the keys to the card readers 416 and periodical key rollover. In some embodiments, the reader key management system 444 may communicate the keys to the card readers 416 directly and/or via the revenue protection manager 420 and/or ticket validation data gathering center 434.

The EMV tokenization engine 446 securely associates a bank card's details with a random token which can be used by the ticketing subsystem without the ticketing subsystem never needing to see the unencrypted bank card details. The EMV tokenization engine 446 may generate the initial token when a particular bank card is first encountered and converts the token back to a bank card data set for billing purposes. The EMV tokenization engine 446 may communicate the token to the card readers 416 directly and/or via the revenue protection manager 420 and/or ticket validation data gathering center 434. The fare calculator 448 will calculate the fare to charge a passenger, post travel, if they use a trusted ticketing token as their preferred ticket media. The account settlement engine 450 bills the passenger for their travel and passes the revenue to the relevant bus operators.

The back office system 404 may also include a persistent fare evader recognition server 438. The persistent fare evader recognition server 438 is a centralized server that will be passed the facial recognition data picked up from the facial detection and video analytics system 424 of each vehicle. The remote driver may flag a particular passenger as having an invalid ticket or no ticket at all. The passenger's face data can be passed to the persistent fare evader recognition server 438, which can then compare the facial data to a massive database of previous offenders to see whether they are a repeat offender. At a configurable threshold of offences the persistent fare evader recognition server 438 will generate a case file and send it to a remote wireless device of transport police 460 for enforcement. The case file may include a type of behavior detected, a time of the behavior, a location of the behavior (and possibly a destination of the vehicle on which the behavior was detected), identification information associated with the passenger (such as a name, photograph, video clip of the behavior, address of the passenger, and/or other data that may be useful for the transport police 460 and/or other enforcement personnel).

This information may be sent electronically, and may be automatically triggered by the determination that the passenger is a repeat offender with the threshold number of infractions. This effectively provides the enforcer with enough evidence to make it worth them pursuing the recognized individual. The transport police 460 referenced in this system design represent a penalization focused revenue protection sub-organization, not necessarily the transport police, who will be supplied with fare evasion evidence that they can act on. The transport police 460 may be external to this system but their needs are central to the outputs of the revenue protection subsystems.

The driver management system 406 may include at least one display screen 452 that enables a remote driver to monitor one or more remote transit vehicles. The display screen 452 allows the remote driver to see the passengers using a full video/audio interface, much like the display screens on the vehicle. The display screen 452 is likely to be a large screen enabling the remote driver to see in detail what is happening on the vehicle. The display screen 452 may also be a touch screen that supports remote control of zoom and panning of one or more cameras on the vehicle. The driver management system 406 may include a remote video link client 454 that provides the local video call management user interface for the remote driver to control. The remote video link client 454 allows the remote driver to answer incoming (audio and/or video) calls from vehicles that have just stopped at a transit stop, transfer calls to other remote drivers or to end a call with a vehicle. The driver management system 406 may also include a remote vehicle systems control client 456 and/or a fault and event warning display 458. The remote vehicle systems control client 456 is a user interface that allows the remote driver to control systems on the vehicles remotely, such as the opening and closing of doors, deployment of a wheelchair ramp, broadcasting of warning or information messages, override of the ticket validation system, etc. For example, the remote vehicle systems control client 456 may be in communication with the door controller 414, card reader 416, and/or ticket validation feedback display 418 via the on-vehicle remote control client 422 and/or the vehicle systems remote control server 430. The fault and event warning display 458 is the user interface system on the desk of each remote driver in the call center. The fault and event warning display 458 allows the remote driver to see the incoming warnings and events detected in the field (such as by vehicle fault detection system 426) and react to the warnings and events. The fault and event warning display 458 may be integrated into the remote driver's control system and/or video system so the remote driver can very quickly take control of the situation on a remotely located vehicle with the minimum of keypresses. In some embodiments, the remote vehicle systems control client 456 and/or fault and event warning display 458 may be integrated into the display screen 452 such that the remote driver has a single device to monitor for information. The display screen 452 may be a touch screen and/or include one or more other input devices (keyboards, mouse, etc.) that allow the remote driver to interact with the display screen 452 to control the cameras, monitor behavior of passengers and/or functionality of vehicle hardware, and/or otherwise control and monitor each of the vehicles.

The remote driver 462 is not actually a driver, since the vehicle is autonomous, but the remote driver 462 represents the authoritative role of a driver and to perform many of the non-driving tasks normally performed by vehicle drivers. The remote driver 462 can work from a call-center type of environment, monitoring and controlling multiple autonomous vehicles simultaneously. One of the main tasks the remote driver 462 will perform is to provide a 'real' human authority during the boarding and alighting of passengers. Just the act of deciding when to close the doors benefits from human control once you consider the movement of families, large amounts of luggage or wheelchairs.

Figure 5:
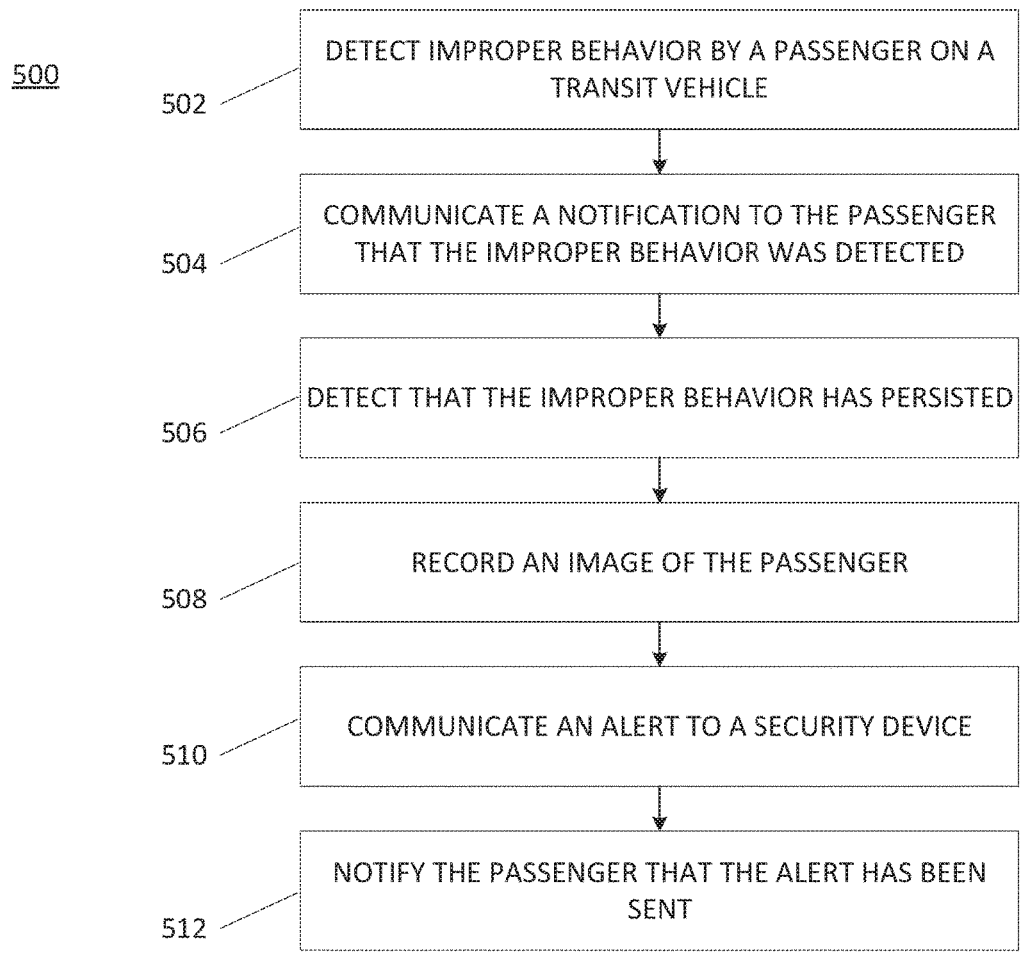
FIG. 5 is a flowchart depicting a process for detecting improper behavior on an autonomous vehicle according to embodiments.

FIG. 5 is a flowchart depicting a process 500 for detecting and handling improper behavior on an autonomous vehicle according to one embodiment. Process 500 may be performed by an autonomous vehicle (such as vehicle 100, 200), an autonomous vehicle system (such as autonomous vehicle system 402), and/or a remote driver system (such as remote control system 300). Process 500 may begin at block 502 by detecting, using an imaging sensor of the autonomous vehicle, improper behavior by a passenger on the transit vehicle. The imaging sensor may be a camera and/or other imaging sensor on a main display screen and/or a secondary display screen of the autonomous vehicle and/or separate imaging sensors. The improper use may include fare evasion, vandalism, theft, aggressive behavior toward others, etc. In some embodiments, the improper behavior may be detected by a remote driver who is monitoring a video feed provided by an imaging sensor of the autonomous vehicle, while in other embodiments a video analytics system may detect the improper behavior and alert the remote driver. As just one example, the card reader and/or imaging sensor may detect that a fare media of the passenger was not successfully validated (either by a failed validation or failure to attempt to validate by the passenger). In such embodiments, the imaging sensor (and/or video feed monitored by the remote driver), may determine that the passenger continued to board the transit vehicle without successfully validating the fare media. In such situations the video analytics and/or remote driver may determine that improper behavior in the form of fare evasion has occurred and provide an input to the system indicating as much.

At block 504, a notification may be communicated to the passenger that the improper behavior was detected. For example, an audio/visual communications device (such as the main display screen and/or secondary display screens) may display the notification (and possibly provide an audio message to the identified passenger) indicating that the improper behavior was detected. In some embodiments, this may involve an automated message being displayed on the audio/visual communication device. For example, a remote driver may input a command to the audio/video communications device to display a pre-recorded text-based message. In other embodiments, the remote driver may initiate an audio/video communication in which the remote driver and see the passenger, be seen by the passenger, ear the passenger, and/or talk to the passenger such that the remote driver can inform the passenger that the improper behavior was detected via a live video message from the remote control device and, if not rectified, corrective action will be taken by the remote driver. In embodiments where the improper behavior was detected using video analytics, an initial notification may be displayed initially, and if upon continuing to detect the improper behavior (and/or detecting that previously detected improper behavior, such as not successfully validating a fare media, has not been rectified) the remote driver may initiate an audio/video communication to interact with the relevant passenger. Similar two-step notification processes may also be done in embodiments in which a remote driver detected the improper behavior.

At block 506, it may be detected, using the imaging sensor and/or one or more other sensors such as a card reader, that the passenger has not rectified the improper behavior. This may be done by the remote driver monitoring the passenger using a video feed from one or more imaging sensors and/or monitoring other sensor data, such as validation result data. If the remote driver (or in some embodiments, video analytics) determines that the improper behavior has persisted, an image and/or video of the passenger may be recorded at block 508. The image may be recorded by any of the imaging sensors of the autonomous vehicle and may be triggered by a command from the remote driver (via a remote control device, such as remote control device 300). An alert may then be wirelessly communicated to a security device at block 510. In some embodiments, the alert may be generated and sent by the autonomous vehicle (directly or being routed though the remote control device, while in other embodiments, the alert may be generated and sent by the remote driver. The alert may include the image of the passenger and an indication of the improper behavior. The alert may also include any other information that may be useful for security personnel to identify the passenger and determine how to handle the improper behavior. In embodiments in which video analytics are used and/or in which identification information is retrievable from the passenger's fare access device, identification information associated with the passenger, such as name, address, transit/behavior history, account/payment information, and/or other information associated with an identified passenger. For example, if the improper behavior is fare evasion, the security personnel may fine the passenger and/or charge a transit account associated with the passenger. The security device may be a personal computer, laptop, personal digital assistant, e-reader, mobile phone, tablet computer, and/or other portable or stationary communications device that may be used by security personnel. In some embodiments, the passenger may be notified that the image has been recorded and sent to the security device at block 512. This alert notification may be done via one of the audio/video communications devices on the autonomous vehicle. For example, a text message may be displayed on the main display screen and/or eon or more of the secondary display screens of the autonomous vehicle. In other embodiments, the remote driver may initiate a video call with the passenger using the main display screen and/or eon or more of the secondary display screens. In other embodiments, the notification can be sent to a mobile wireless device of the passenger, such as a textual message via an email, SMS message, push notification via a transit application on the mobile wireless device, and/or other electronic message. In some embodiments, in addition or alternative to the textual message, an audio and/or haptic indication may be sent to the mobile wireless device.

In some embodiments, process 500 may include determining that the passenger is a repeat offender. This may be done by checking a database of previous offenders. In some embodiments, a repeat offender may be any passenger who has previously committed improper behavior (depending on the application the detected improper behavior must be the same as a previously recorded behavior to be a repeat offender, while in other embodiments any previous improper behavior may qualify the passenger as a repeat offender), while in other embodiments, a particular threshold over two instances of improper behavior must be detected to qualify as a repeat offender. If the passenger is a repeat offender, an alert may be send to the remote driver and/or the security device to inform the remote driver and/or security personnel that the passenger is a repeat offender. In some embodiments, after being informed that the passenger is a repeat offender, the remote driver may send the alert to the security device. In some embodiments, this alert may be included with the original alert of improper behavior that is sent to the remote driver and/or the security device, while in other embodiments, this alert may be a separate communication.

In some embodiments, process 500 may include providing a current location of the vehicle to the security device. This allows the security personnel to determine where to meet the vehicle if it is determined that proper action in response to the detected improper behavior is to apprehend the passenger and/or remove the passenger from the vehicle. In some embodiments, the security personnel may use the location data to intercept the vehicle, while in other embodiments the security personnel may retrieve and/or receive destination information related to the vehicle that allow the security personnel to meet the vehicle at an upcoming destination. In other embodiments, the security personnel may identify a location that would be appropriate to intercept the vehicle. The security personnel may provide this location to the remote driver and/or the vehicle such that the vehicle is commanded to stop and/or reroute to the location. Once the vehicle has arrived at the location, the vehicle may stop and await the arrival of security personnel. In some embodiments, the presence of the security personnel may be detected using one or more of the imaging sensors of the vehicle. For example, the imaging sensors may record an area outside of the vehicle and capture images of the security personnel and/or their credentials, such as badges or other identifiers. The detection of the security personnel may be done by video analytics and/or by the remote driver monitoring the image feed. Upon detecting the presence of the security personnel, the vehicle may be commanded (such as by the remote driver) to actuate the doors of the vehicle.

In some embodiments, a secondary audio/visual communications device (such as secondary display screen 410) may be positioned at some of all of the seats in the transit vehicle. The process 500 may include establishing a video communications link with at least one of the secondary audio/visual communications devices based on the detection of the improper behavior. For example, the remote driver may feel that the improper behavior is minor and wish to handle the matter in a discrete manner. In such cases, the remote driver may use the video capabilities of the secondary display screens to locate the relevant passenger. The remote driver may then establish a video call with the passenger using the secondary display screen. In other embodiments, the remote driver may wish to discretely speak with any other passengers on the vehicle, such as those affected by the improper behavior. For example, the remote drive may wish to assure passengers that a matter is being resolved, check to see if the passengers are okay, and/or ask the other passengers to provide additional information about the behavior of a particular passenger. Such interactions may be done via video calls using the secondary display screens.

In some embodiments, the process 500 may include detecting, using one or more fault detection sensors of the vehicle, a problem with the transit vehicle. Any detected problems may be automatically communicated to the remote control system. The remote driver may review the problems and provide a command from the control system to perform a specific function based on the problem. For example, if a fire is detected, the remote driver may stop the vehicle, open the doors, and instruct any passengers to exit the vehicle. Once empty, the remote driver could instruct the vehicle to drive toward a fire crew and/or empty lot to minimize damage. If there is damage to the vehicle itself that may affect ride quality the vehicle may be removed from service and routed to a maintenance facility.

One particular use case of process 500 is described below. For example, a ticket validator (card reader) may reject a ticket and/or other access credential as being invalid and/or having insufficient funds. The passenger may continue to board the vehicle despite the failed validation. An automated message and/or audio may be produced by one or more of the display screens of the vehicle. If the passenger continues to board (or remains on board) a live video link is established between the remote driver and a display screen proximate the passenger such that the remote driver can instruct the passenger to validate successfully or leave the vehicle. If the passenger refuses to leave and/or validate, the remote driver may cause an imaging device to capture an image of the passenger, which may be sent to security personnel along with an alert of the improper behavior. This may be logged as evidence. The passenger may then be informed, such as by the remote driver in the video call, that the photograph was taken and the alert sent to security personnel. If an identity of the passenger is known, the remote driver may then query a database to determine if the passenger is a repeat offender and take whatever action is deemed necessary based on the determination. In some embodiments, the security personnel may decide that the passenger needs to be apprehended and/or removed from the vehicle. The security personnel may work with the remote driver to identify or set up a proper interception point, and the vehicle may be routed and stopped at such a point. To prevent the passenger from fleeing, the remote driver may close and/or lock the doors of the vehicle until security personnel has arrived.

Figure 6:
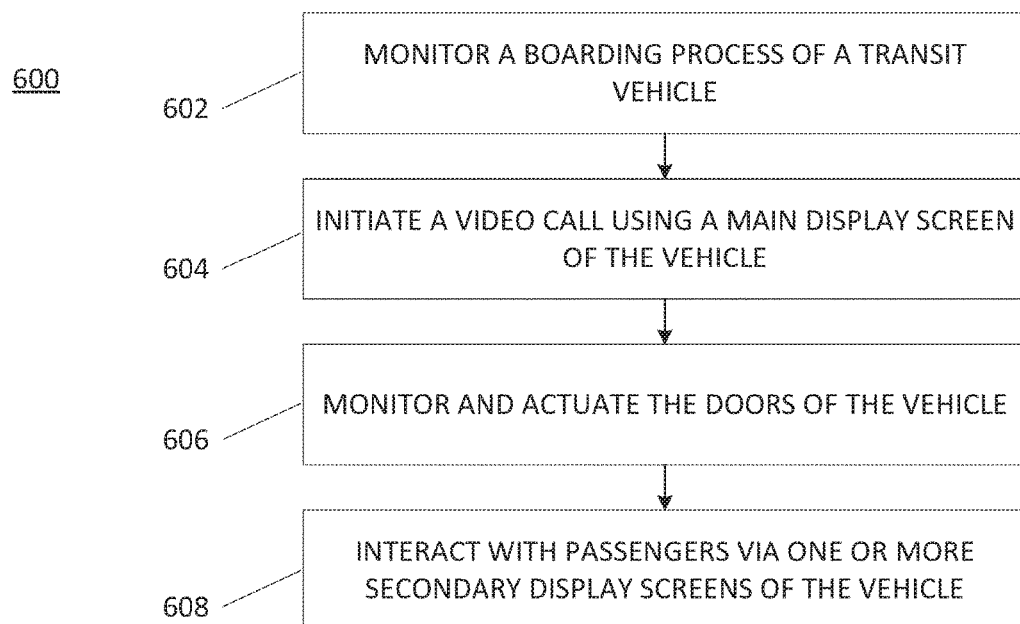
FIG. 6 is a flowchart depicting a process for remotely controlling non-driving functions of an autonomous vehicle according to embodiments.

FIG. 6 is a flowchart depicting a process 600 for remotely controlling an autonomous vehicle according to embodiments of the invention. Process 600 may be performed by an autonomous vehicle (such as autonomous vehicle 100, 200), an autonomous vehicle system (such as autonomous vehicle 402), and/or a remote driver system (such as remote control system 300). Process 600 may begin at block 602 by monitoring the boarding and/or exit process of a transit vehicle. The monitoring may be done by a remote driver observing a video feed from a main display screen mounted near an entrance and/or exit of the vehicle. The remote driver may initiate a video call using one or more main display screens positioned near entrances and/or exits of the vehicle at block 604. This allows the remote driver to greet passengers, as well as monitor their behavior and/or validation attempts. The passengers may see a video image of the remote driver and talk to the remote driver using one or more microphones that are built into and/or positioned near the main display screen. The remote driver may assist passengers with valuation and boarding by explaining how to interact with the card reader and/or other validation device. The remote driver can ensure that each of the boarding passengers has properly validated their access credential. If not, the remote driver may virtually confront the relevant passenger using one or more display screens of the autonomous vehicle in a manner similar to as described in process 500.

The remote driver may also monitor the boarding/exiting passengers and actuate the doors of the autonomous vehicle based on the presence and needs of the passengers at block 606. For example, the remote driver may ensure that all passengers have boarded and/or exited that plan to before closing the doors. Similarly, the remote driver can ensure that passengers having small children and/or luggage, etc. have sufficient time to board and/or exit the vehicle. The remote driver may also interact with one or more of the passengers via secondary display screens at block 608. This may be done to answer questions or otherwise talk to the passengers on an individual basis. For example, the remote driver may be able to inform a passenger as to which transit stop the passenger should exit at. Data may be received from a number of sensors of the autonomous vehicle at block 608. The data may include ambient noise data, smoke detector data, carbon monoxide data, vehicle systems data, and the like. This data may be provided to a remote driver who may send a command to one or more components of the autonomous vehicle to perform a particular action based on the sensor data. For example, the remote driver may remotely adjust a volume level of any of the display screens, public announcement (PA) speakers, and/or other speakers based on the detected ambient noise level within and/or around the autonomous vehicle. As another example, the remote driver may initiate a video call and/or PA announcement to direct passengers on how to react when the sensors detect smoke and/or high carbon monoxide levels. The remote driver may similarly instruct passengers how to react if a mechanical problem is detected that needs the vehicle to be removed from service. Additionally, the remote driver may alter the route of the autonomous vehicle, thereby manipulating the drive mechanism of the vehicle to change the speed and/or heading of the vehicle to maneuver to a particular designation, such as a closest transit stop and/or a maintenance location.

It will be appreciated that some or all the steps of processes 500 and 600 may be combined, as the duties and functionality of the remote driver and remote control system are fluid and require the remote driver to react to unpredictable and ever changing circumstances. It will also be appreciated that when information, video, and/or other data is provided to the remote driver, the data is provided by sending the data or a remote control system, such as remote control system 300, that is accessible to and monitored by remote driver. Each action performed by remote driver is a result of the remote driver interaction with the remote control device to wirelessly send a command to a component of the autonomous vehicle that causes the component to perform a particular function.

Figure 7:
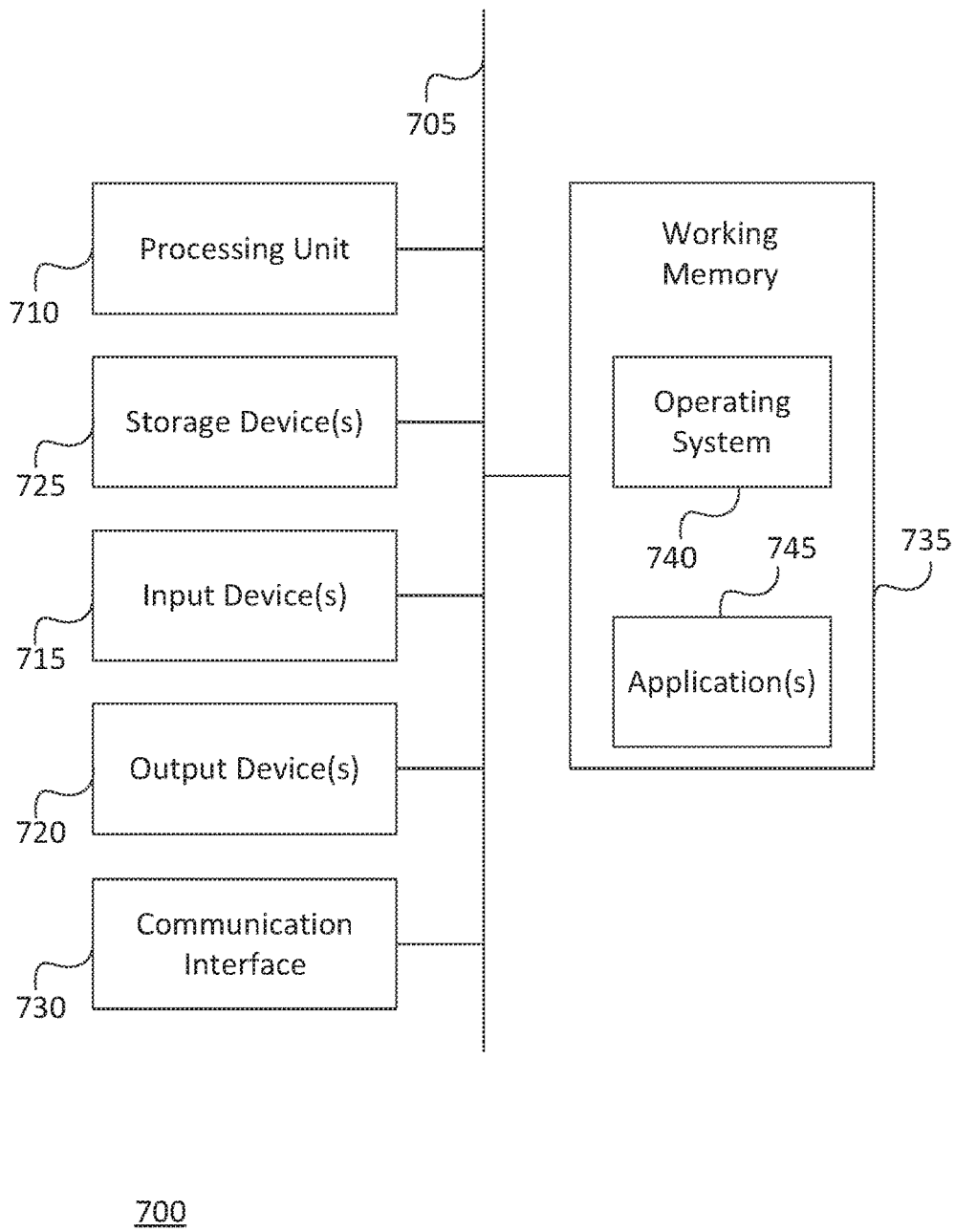
FIG. 7 is a block diagram of an example computing system according to embodiments.

A computer system as illustrated in FIG. 7 may be incorporated as part of the previously described computerized devices. For example, computer system 700 can represent some of the components of the autonomous vehicle 100, 200, remote control system 300, components of system 400, and the like described herein. FIG. 7 provides a schematic illustration of one embodiment of a computer system 700 that can perform the methods provided by various other embodiments, as described herein. FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include a processing unit 710, including without limitation one or more processors, such as one or more special-purpose processors (such as digital signal processing chips, graphics acceleration processors, and/or the like); one or more input devices 715, which can include without limitation a keyboard, a touchscreen, receiver, a motion sensor, a camera, a smartcard reader, a contactless media reader, and/or the like; and one or more output devices 720, which can include without limitation a display device, a speaker, a printer, a writing module, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communication interface 730, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 730 may permit data to be exchanged with a network (such as the network described below, to name one example), other computer systems, and/or any other devices described herein. In many embodiments, the computer system 700 will further comprise a non-transitory working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 710, applications 745, etc.) Further, connection to other computing devices such as network input/output devices may be employed.

Some embodiments may employ a computer system (such as the computer system 700) to perform methods in accordance with the disclosure. For example, some or all of the procedures of the described methods may be performed by the computer system 700 in response to processing unit 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processing unit 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processing unit 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 725. Volatile media include, without limitation, dynamic memory, such as the working memory 735. Transmission media include, without limitation, coaxial cables, copper wire, and fiber optics, including the wires that comprise the bus 705, as well as the various components of the communication interface 730 (and/or the media by which the communication interface 730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a non-transitory storage device 725 either before or after execution by the processing unit 710.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. An autonomous transit vehicle, comprising:
a vehicle body;
a drive mechanism configured to propel the vehicle body;
an audio/video communications device that is in communication with a remote control system;
an imaging sensor;
a processing unit in communication with the drive mechanism, the audio/video communications device, and the imaging sensor;
a memory having instructions stored thereon that, when executed, cause the processing unit to:
detect, using the imaging sensor, improper behavior by a passenger on the transit vehicle;
communicate, using the audio/visual communications device, a notification to the passenger that the improper behavior was detected;
detect, using the imaging sensor, that the passenger has not rectified the improper behavior;
record, using the imaging sensor, an image of the passenger;
communicate an alert to a security device, the alert comprising the image of the passenger and an indication of the improper behavior; and
notify the passenger that the image has been recorded and sent to the security device.

2. The autonomous transit vehicle of claim 1, wherein the instructions further cause the processing unit to:
determine that the passenger is a repeat offender, wherein the alert further includes an indication that the passenger is a repeat offender.

3. The autonomous transit vehicle of claim 1, wherein the instructions further cause the processing unit to:
detect that a fare media of the passenger was not successfully validated, wherein detecting the improper behavior comprises determining that the passenger continued to board the transit vehicle without successfully validating the fare media.

4. The autonomous transit vehicle of claim 1, wherein:
the notification comprises a live video message from the remote control device.

5. The autonomous transit vehicle of claim 1, wherein:
the notification comprises a pre-recorded text-based message.

6. The autonomous transit vehicle of claim 1, wherein the instructions further cause the processing unit to:
provide a current location of the vehicle to the security device;
receive a destination from the security device;
maneuver the transit vehicle to the destination; and
stop the transit vehicle at the destination.

7. The autonomous transit vehicle of claim 1, wherein the instructions further cause the processing unit to:
detect the presence of security personnel at the destination; and
actuate doors of the transit vehicle based on the presence of the security personnel.

8. The autonomous transit vehicle of claim 1, further comprising:
a secondary audio/visual communications device positioned at each set of seats in the transit vehicle, wherein the instructions further cause the processing unit to establish a video communications link with at least one of the secondary audio/visual communications devices based on the detection of the improper behavior.

9. The autonomous transit vehicle of claim 1, wherein the instructions further cause the processing unit to:
detect, using one or more fault detection sensors, a problem with the transit vehicle;
communicate the problem to a remote control system; and receive a command from the control system to perform a specific function based on the problem.

10. The autonomous transit vehicle of claim 9, wherein: the command comprises adjusting a route of the transit vehicle based on the problem.

11. A method of remotely controlling non-driving functions of an autonomous vehicle, comprising:
    detecting, using an imaging sensor of the autonomous vehicle, improper behavior by a passenger on the transit vehicle;
    communicating, using an audio/visual communications device of the autonomous vehicle, a notification to the passenger that the improper behavior was detected;
    detecting, using an imaging sensor of the autonomous vehicle, that the passenger has not rectified the improper behavior;
    recording, using the imaging sensor, an image of the passenger;
    communicating an alert to a security device, the alert comprising the image of the passenger and an indication of the improper behavior; and
    notifying the passenger that the image has been recorded and sent to the security device.

12. The method of remotely controlling non-driving functions of an autonomous vehicle of claim 11, further comprising:
    determining that the passenger is a repeat offender, wherein the alert further includes an indication that the passenger is a repeat offender.

13. The method of remotely controlling non-driving functions of an autonomous vehicle of claim 11, further comprising:
    detecting that a fare media of the passenger was not successfully validated, wherein detecting the improper behavior comprises determining that the passenger continued to board the transit vehicle without successfully validating the fare media.

14. The method of remotely controlling non-driving functions of an autonomous vehicle of claim 11, wherein:
    the notification comprises a live video message from the remote control device.

15. The method of remotely controlling non-driving functions of an autonomous vehicle of claim 11, wherein:
    the notification comprises a pre-recorded text-based message.

16. The method of remotely controlling non-driving functions of an autonomous vehicle of claim 11, further comprising:
    providing a current location of the vehicle to the security device;
    receiving a destination from the security device;
    maneuvering the transit vehicle to the destination; and
    stopping the transit vehicle at the destination.

17. The method of remotely controlling non-driving functions of an autonomous vehicle of claim 11, further comprising:
    detecting the presence of security personnel at the destination; and
    actuating doors of the transit vehicle based on the presence of the security personnel.

18. The method of remotely controlling non-driving functions of an autonomous vehicle of claim 11, further comprising:
    establishing a video communications link with at least one secondary audio/visual communications devices based on the detection of the improper behavior.

19. The method of remotely controlling non-driving functions of an autonomous vehicle of claim 18, further comprising:
    detecting, using one or more fault detection sensors, a problem with the transit vehicle; and
    causing the performance of a specific function based on the detected problem.

* * * * *